(12) United States Patent
Carlson et al.

(10) Patent No.: US 8,124,661 B2
(45) Date of Patent: *Feb. 28, 2012

(54) INTRODUCING VOIDS INTO POLYMERIC MATERIAL FOR BUFFERING ONE OR MORE STRESS SENSITIVE COMPONENTS FROM ONE OR MORE STRESSES

(75) Inventors: Kurt R. Carlson, Simi Valley, CA (US); Kristin C. Cooley, Sherman Oaks, CA (US); John P. Rahn, West Hills, CA (US); Manfred Schiruska, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 10/600,984

(22) Filed: Jun. 20, 2003

(65) Prior Publication Data

US 2004/0259964 A1  Dec. 23, 2004

(51) Int. Cl.
*C08J 9/00* (2006.01)
*G01C 19/72* (2006.01)

(52) U.S. Cl. ............ 521/76; 521/50; 385/100; 385/101; 385/102

(58) Field of Classification Search ............ 521/50–189; 385/100, 101, 102
See application file for complete search history.

(56) References Cited

U.S. PATENT DOCUMENTS

| 4,107,354 | A | * | 8/1978 | Wilkenloh et al. ............ 427/118 |
| 5,371,593 | A | | 12/1994 | Cardova et al. |
| 5,546,482 | A | | 8/1996 | Cordova et al. |
| 5,562,985 | A | * | 10/1996 | Sano et al. .................... 428/375 |
| 5,706,175 | A | * | 1/1998 | Takei ............................ 361/760 |
| 5,745,627 | A | * | 4/1998 | Arroyo et al. ................. 385/101 |
| 6,054,068 | A | | 4/2000 | Carlson et al. |
| 6,509,959 | B1 | | 1/2003 | Carlson et al. |
| 2001/0000930 | A1 | | 5/2001 | Kim |

FOREIGN PATENT DOCUMENTS

| DE | 28 54 581 | | 6/1980 |
| EP | 0 660 082 | | 6/1995 |
| EP | 0 752 603 | | 1/1997 |
| EP | 1 398 654 | | 3/2004 |
| WO | WO 99/36820 | * | 7/1999 |

OTHER PUBLICATIONS

"Poisson's Ratio of Foamed Plastics" by Dement'ev et al., Mechanics of Composite Materials, Jan. 1975, pp. 37-40.*

* cited by examiner

*Primary Examiner* — Irina S Zemel
(74) *Attorney, Agent, or Firm* — Carmen Patti Law Group, LLC

(57) ABSTRACT

A plurality of voids are introduced into a polymeric material. One or more stress sensitive components in abutment with a portion of the polymeric material are buffered from one or more stresses through employment of the portion of the polymeric material that comprises one or more voids of the plurality of voids. A movement of the portion of the polymeric material is accommodated through compression of one or more of the one or more voids.

20 Claims, 2 Drawing Sheets

INTRODUCING VOIDS INTO POLYMERIC MATERIAL FOR BUFFERING ONE OR MORE STRESS SENSITIVE COMPONENTS FROM ONE OR MORE STRESSES

CROSS-REFERENCE TO RELATED APPLICATION

This application contains subject matter which is related to the subject matter of the following application, which is assigned to the same assignee as this application. The below-listed application is hereby incorporated herein by reference in its entirety:

"POLYMERIC MATERIAL WITH VOIDS THAT COMPRESS TO ALLOW THE POLYMERIC MATERIAL TO ABSORB APPLIED FORCE AND DECREASE REACTION FORCE TO ONE OR MORE SENSOR FIBERS," by Carlson, et al., co-filed herewith.

TECHNICAL FIELD

The invention relates generally to stress sensitive components and more particularly to buffering stress sensitive components.

BACKGROUND

Polymeric materials in one example are used for buffering sensor fibers. For example, the polymeric material coats the sensor fiber for protection of the sensor fiber. In one example, the polymeric material comprises a potting compound and the sensor fiber comprises an optical fiber. The potting compound comprises a buffer layer for the optical fiber. The optical fiber is wound about a spool in a winding pattern to form a fiber optic coil. A fiber optic gyroscope in one example employs the fiber optic coil to sense a rate of rotation. The fiber optic coil comprises a plurality of windings along the length of the spool and one or more layers of windings. As the optical fiber is wound about the spool, the potting material is applied to the outer surface of the optical fiber. For example, a syringe and brush applicator coats the fiber optic coil with the potting material. The potting material promotes precision in the winding pattern of the fiber optic coil.

The potting compound in one example fills a space between each of the windings and the layers of windings. For example, the potting compound acts a buffer layer between each of the windings and the layers of windings. Upon expansion of the fiber optic coil, the fiber optic coil applies a force on the potting compound. The potting compound has a high bulk modulus. Thus, in response to the applied force the potting compound applies a reaction force on the fiber optic coil. The reaction force applies a pressure, stress, and/or strain on the fiber optic coil. As one shortcoming, the applied pressure, stress, and/or strain on the fiber optic coil may promote a decrease in performance of the fiber optic coil. For example, the rotation measurement of the fiber optic coil for the fiber optic gyroscope may experience a greater bias error due to the applied pressure, stress, and/or strain.

Thus, a need exists for a polymeric material that absorbs a larger portion of an applied force from a sensor fiber. A further need exists for a polymeric material that promotes a decrease in reaction pressure, stress, and/or strain applied to a sensor fiber.

SUMMARY

The invention in one embodiment encompasses a method. A plurality of voids are introduced into a polymeric material. One or more stress sensitive components in abutment with a portion of the polymeric material are buffered from one or more stresses through employment of the portion of the polymeric material that comprises one or more voids of the plurality of voids. A movement of the portion of the polymeric material is accommodated through compression of one or more of the one or more voids.

The invention in another embodiment encompasses a method. A plurality of voids are introduced into a potting compound. A fiber optic sensing coil of a fiber optic gyroscope is encapsulated with a portion of the potting compound that comprises one or more voids of the plurality of voids. A decrease in a bias error of the fiber optic sensing coil is promoted though accommodation of an expansion of the fiber optic sensing coil by a compression of one or more of the one or more voids.

The invention in yet another embodiment encompasses a method. A plurality of voids are introduced into a polymeric material. One or more stress sensitive components are coated with a portion of the polymeric material that comprises one or more of the plurality of voids. An expansion of the one or more stress sensitive components is accommodated through compression of one or more of the one or more voids.

DESCRIPTION OF THE DRAWINGS

Features of exemplary implementations of the invention will become apparent from the description, the claims, and the accompanying drawings in which:

DETAILED DESCRIPTION

Figure 1:
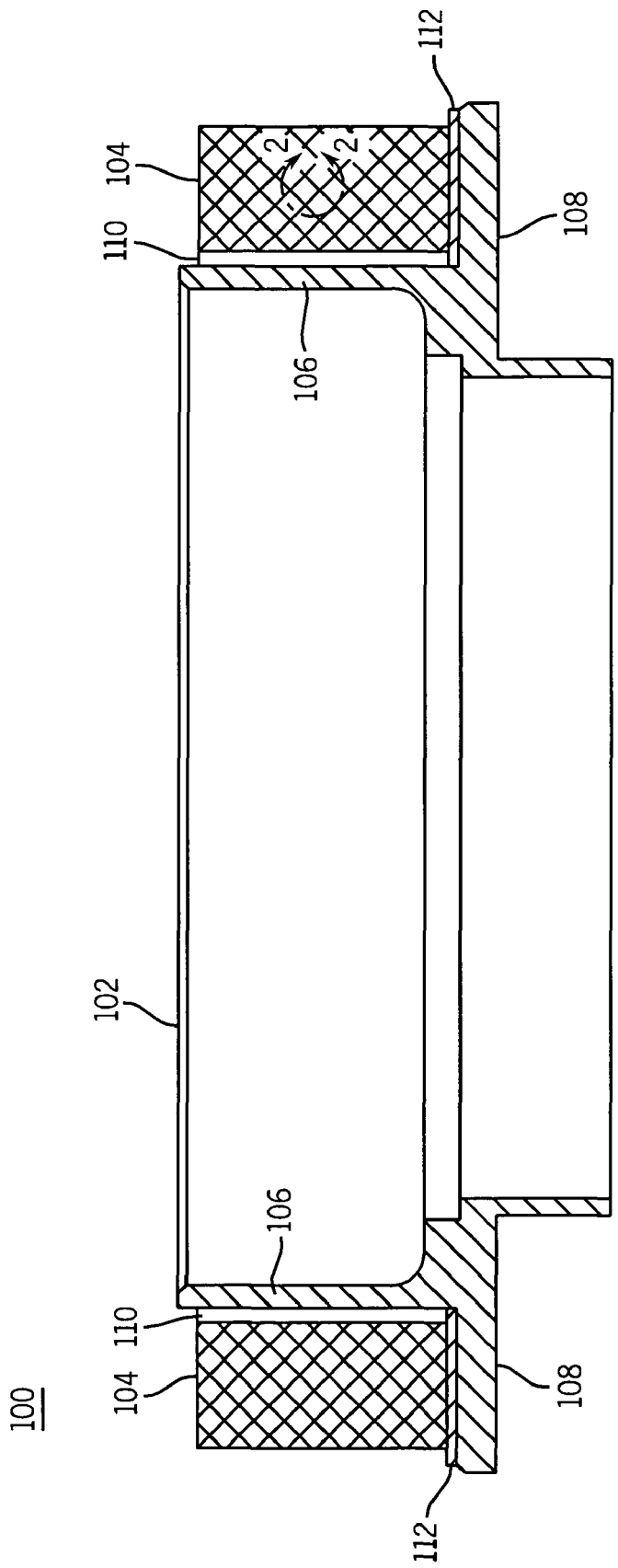
FIG. 1 is a sectional representation of one exemplary implementation of an apparatus that comprises one or more spools and one or more sensor fiber coils.

Turning to FIG. 1, an apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The apparatus 100 in one example comprises one or more spools 102 and one or more sensor fiber coils 104. For example, the apparatus 100 comprises a sensing component of a fiber optic gyroscope. The fiber optic gyroscope in one example comprises a light source, a beam splitter, the sensor fiber coil 104, and processing electronics. Light from the light source is split by the beam splitter into two counter-propagating waves traveling through the sensor fiber coil 104. The processing electronics measure a phase relationship between the two counter-propagating beams of light that emerge from opposite ends of the sensor fiber coil 104. The difference between the phase shifts experienced by the two beams is proportional to the rate of rotation of the fiber optic gyroscope, due to the Sagnac effect, as will be understood by those skilled in the art.

The spool 102 provides a support structure for the sensor fiber coil 104. The spool 102 comprises a hub 106 and a flange 108. The hub 106 in one example comprises a solid or hollow cylindrical member. The flange 108 comprises a rim at an end of the hub 106. The diameter of the flange 108 is larger than the diameter of the hub 106. The hub 106 and the flange 108 in one example comprise a rigid material such as steel. In a further example, the hub 106 and the flange 108 comprise a unitary construction and/or integral formation.

In one example, the hub 106 and the flange 108 directly support the sensor fiber coil 104. In another example, buffer layers 110 and 112 support the sensor fiber coil 104. The buffer layer 110 is located on the hub 106 and the buffer layer 112 is located on the flange 108. For example, the buffer layer 110 is located between the hub 106 and the sensor fiber coil 104 and the buffer layer 112 is located between the flange 108 and the sensor fiber coil 104. The buffer layers 110 and 112 comprise compressible and/or resilient layers. For example, the buffer layers 110 and 112 comprise a polymeric material, such as a potting compound. The buffer layer 110 in one example comprises a coating on the hub 106. The buffer layer 112 in one example comprises a coating on the flange 108. The buffer layers 110 and 112 serve to promote a decrease in strain and strain gradients in the sensor fiber coil 104.

The buffer layers 110 and 112 in one example are applied to the spool 102 before the sensor fiber coil 104 is wound about the hub 106. For example, the buffer layers 110 and 112 are applied to the spool 102 in a liquid or paste form. Next, the buffer layers 110 and 112 are preserved and/or finished. For example, the buffer layers 110 and 112 are cured. In another example, the buffer layers 110 and 112 are pre-formed and then applied to the spool 102.

Figure 2:
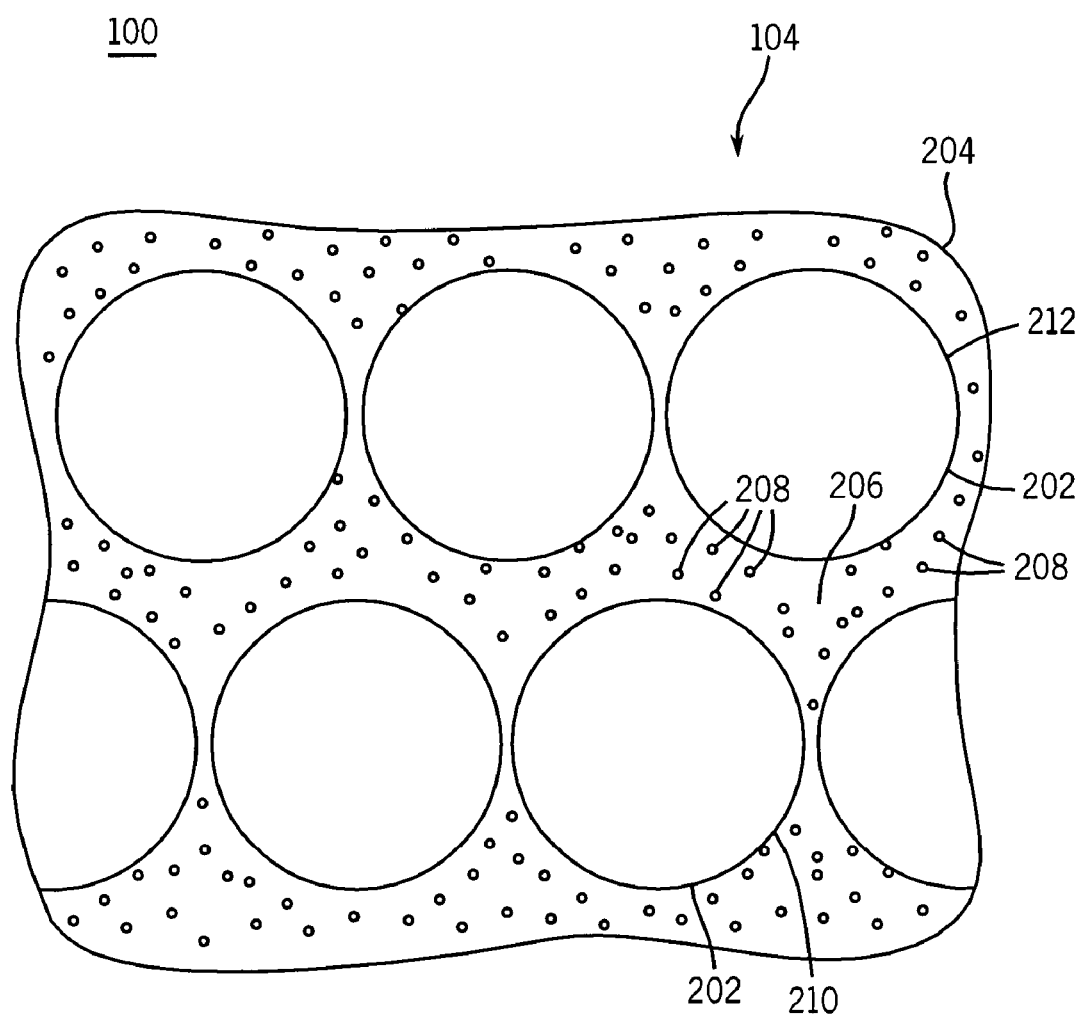
FIG. 2 is a sectional representation of the sensor fiber coil directed along line 2-2 of FIG. 1.

Turning to FIGS. 1 and 2, the sensor fiber coil 104 in one example comprises one or more sensor fibers 202 and a polymeric material 204. For example, the one or more sensor fibers 202 comprise one or more stress sensitive components and the polymeric material 204 buffers the stress sensitive components from one or more stresses. The sensor fiber 202 in one example comprises an optical path or waveguide for propagation of light. The sensor fiber 202 comprises a relatively high thermal expansion coefficient. During thermal increases, the sensor fiber 202 expands. During thermal decreases, the sensor fiber 202 contracts. The expansions and/or contractions exert circumferential strain on a glass core of the sensor fiber 202.

The sensor fiber 202 is wound about the hub 106, for example, in one or more layers. Each layer in one example is located at a respective approximate distance outward from the hub 106. For example, a first layer is wound directly on the hub 106. In another example, the first layer is wound onto the buffer layer 110 atop the hub 106. Subsequent layers are wound about the first layer. The sensor fiber coil 104 in one example comprises a quadrapole-winding pattern. In another example, the sensor fiber coil 104 comprises a dipole-winding pattern, as will be understood by those skilled in the art.

The polymeric material 204 in one example comprises a carbon filled silicon material or a silver filled silicon material. For example, the polymeric material 204 comprises a potting compound. The polymeric material 204 serves to bond together turns of the sensor fiber coil 104. As the sensor fiber 202 is wound about the spool 102, the polymeric material 204 is applied to the outer surface of the sensor fiber 202. For example, a syringe and brush applicator coats the sensor fiber 202 with the polymeric material 204. The polymeric material 204 serves to hold the sensor fiber coil 104 as a wound unit about the spool 102. For example, the polymeric material 204 is located between adjacent portions of the sensor fiber 202.

The polymeric material 204 comprises a solid material 206 and a plurality of voids 208. The voids 208 fill a controlled volume percentage of the polymeric material 204. The voids 208 in one example fill up to twenty-five percent of the total volume of the polymeric material 204. In a further example, the voids 208 fill ten percent of the total volume of the polymeric material 204. An introduction of the voids 208 into the polymeric material 204 reduces the density of the polymeric material 204. The introduction of the voids 208 into the polymeric material 204 also promotes a decrease in a bulk modulus of the polymeric material 204. In a further example, the introduction of the voids 208 into the polymeric material 204 promotes the decrease in the bulk modulus without substantially altering a Young's modulus of the polymeric material 204. The bulk modulus ("B") of the polymeric material 204 is defined by the following exemplary equation:

$$B = V(dP/dV)$$

Where "V" represents the volume of the polymeric material 204.

Where "P" represents the external pressure.

The ratio of bulk modulus ("B") to Young's modulus ("E") of the polymeric material 204 is defined by the following exemplary equation:

$$B/E = 1/[3(1-2\rho)]$$

Where "ρ" represents the Poisson's ratio.

In one example, the polymeric material 204 with the voids 208 has a lower Poisson's ratio than the solid material 206 without voids. Since the voids 208 do not substantially alter the Young's modulus of the solid material 206, then it follows that a decrease in the Poisson's ratio results in a decrease in the bulk modulus of the polymeric material 204. Thus, in one example a decrease in the Poisson's ratio from 0.499 to 0.490 results in a decrease in the ratio of bulk modulus to Young's modulus by a factor of ten.

The bulk modulus of a solid polymer in one example is substantially greater than the bulk modulus of a gas. For example, the bulk modulus of the solid polymer may be ten thousand times greater than the bulk modulus of the gas. Also, thermal pressure coefficients of the solid polymer in one example are substantially greater than the thermal pressure coefficients of the gas. For example, the thermal pressure coefficients of the solid polymer may be three thousand times greater than the thermal pressure coefficients of the gas. Thus, a controlled amount of the voids 208 in the polymeric material 204 decreases the bulk modulus and thermal pressure coefficient of the polymeric material 204.

The voids 208 in one example comprise a structure that preserves a space in the solid material 206. In one example, the voids 208 comprise hollow elastomeric bubbles, for example, hollow elastomeric crospheres. The hollow elastomeric microspheres in one example comprise one or more of microballoons and microfibers. For example, the microballoons result in microbubbles in the solid material 206 and the microfibers result in microchannel in the solid material 206. The hollow elastomeric microspheres comprise thin walls that encapsulate a gas to allow for easy compression. For example, the walls of the hollow elastomeric microspheres are strong enough to avoid breakage under pressure, but thin enough to easily compress. Once cured in the solid material 206, the hollow elastomeric microspheres comprise substantially similar compressibility characteristics as gas bubbles.

The voids 208 in one example are added to a resin of the solid material 206 in a substantially uniform distribution. For example, the hollow elastomeric microspheres are stirred into the resin of the solid material 206. A coupling agent in one example is used to increase an adhesion between the hollow elastomeric microspheres and the solid material 206. The coupling agent in one example comprises organofunctional reactive silane. The coupling agent also promotes a decrease in a rate of settling of the hollow elastomeric microspheres in the solid material 206. For example, the coupling agent maintains the substantially uniform distribution of the hollow elastomeric microspheres in the solid material 206. The solid material 206 and the voids 208 are cured to maintain the substantially uniform distribution of the voids 208 within the solid material 206.

In one example, the voids 208 comprise one or more gas (e.g., air) bubbles in the solid material 206. For example, polymeric material 204 comprises an elastomeric foam. The polymeric material 204 is sprayed through an aerator component to introduce the voids 208 into the solid material 206. The aerator component comprises an aerosol sprayer or an airbrush. The aerator component introduces the gas bubbles into the solid material 206. The aerator component in one example applies the polymeric material 204 to one or more stress sensitive components to buffer the stress sensitive components from one or more stresses.

An air-entrainer in one example introduces and stabilizes the voids 208 into the solid material 206. The air-entrainer mixes a plurality of gas bubbles into the solid material 206. The air-entrainer is selected from a plurality of air-entrainers based on a chemical formula of the polymeric material 204. In one example, the air-entrainer comprises a surfactant with a hydrophobic end and a hydrophilic end. The hydrophilic end is attracted to a base material and the hydrophobic end acts to isolate and stabilize the air bubbles caused by mixing. In another example, the air-entrainer comprises a first end that is attracted to the polymeric material 204 and a second end that is repulsed by the polymeric material 204. Where the polymeric material 204 comprises a silicone, the air-entrainer in one example comprises a self-assembling monolayer material. The self-assembling monolayer material in one example comprises octadecyltrichlorosilane. Octadecyltrichlorosilane comprises one end that is attracted to silicon and one end that is repulsed by silicon. Thus, octadecyltrichlorosilane promotes a stabilization of the gas bubbles in the solid material 206.

A blowing agent in one example introduces the voids 208 into the solid material 206. For example, the blowing agent comprises a chemical blowing agent. The chemical blowing agent is heated to an elevated temperature for decomposition. Upon decomposition, the chemical blowing agent releases gas bubbles that are trapped within the solid material 206 to form the voids 208. The blowing agent in one example comprises azodicarbonamide or p-toluene tulfonyl hydrazide. The blowing agent is selected based on a preferred decomposition temperature. For example, azodicarbonamide decomposes around two hundred and ten degrees Celsius and p-toluene tulfonyl hydrazide decomposes around one hundred and twenty degrees Celsius.

A diffuser in one example introduces the voids 208 into the solid material 206. The diffuser comprises a diffuser disc with small holes capable of releasing gas bubbles. Before the polymeric material 204 is cured, the diffuser disc is placed at a bottom of a container that holds the solid material 206. The diffuser disc is activated and begins to release the gas bubbles into the solid material 206 near the bottom of the container. The diffuser disc is raised through the solid material 206 at a steady rate to release the gas bubbles into the solid material 206 in an even distribution up to the top of the container. Then, the diffuser disc is removed from the container and the polymeric material 204 is cured to preserve the gas bubbles.

A plurality of dissolvable structures in one example introduce the voids 208 into the solid material 206. For example, the dissolvable structures comprise dissolvable microstructures. The dissolvable microstructures are mixed into the solid material 206. The dissolvable microstructures are heated to an activation temperature which dissolves the dissolvable microstructures. Once the dissolvable microstructures dissipate, the voids 208 remain in the solid material 206.

An applicator brush that comprises a plurality of hollow bristles in one example introduces the voids 208 into the solid material 206. The applicator brush is connected to a gas supply. During application of the polymeric material 204 to the stress sensitive components, the applicator brush outputs gas through the hollow bristles into the solid material 206. For example, the hollow bristles create gas bubbles in the solid material 206.

A pressure-sensitive foam tape in one example introduces the voids 208 into a potting compound that encapsulates the stress sensitive components. For example, the pressure-sensitive foam tape is formed from the polymeric material 204 with the voids 208. The pressure-sensitive foam tape is applied to the stress sensitive components. The pressure-sensitive foam tape and the stress sensitive components are then encapsulated with the potting compound. The pressure-sensitive foam tape promotes a reduction in a bulk modulus of the potting compound.

The voids 208 comprise a diameter that is smaller than a distance of separation between adjacent portions 210 and 212 of the sensor fiber 202. For example, one or more of the voids 208 fit between the adjacent portions 210 and 212 of the sensor fiber 202. The voids 208 in one example comprise the hollow elastomeric microspheres with a diameter that is small enough to fit between the adjacent portions 210 and 212 of the sensor fiber 202. For example, in one implementation the diameter of the voids 208 of the sensor fiber coil 104 for the fiber optic gyroscope is less than fifty micrometers. In a further example, the diameter of the hollow elastomeric microspheres is twelve micrometers.

In one example, the voids 208 reserve space in the solid material 206 to increase a compressibility of the polymeric material 204. For example, the voids 208 promote an increase in an amount of an applied force the polymeric material 204 can absorb. Upon an introduction of the applied force to a portion of the polymeric material 204, one or more of the voids 208 compress to allow the portion of the polymeric material 204 to absorb a portion of the applied force. For example, the applied force pushes a portion of the solid material 206 into the space previously reserved by the voids 208. The voids 208 also promote a decrease of a reaction force generated by the portion of the polymeric material 204 in response to the applied force. Since the voids 208 allow the polymeric material 204 to absorb a larger portion of the applied force, the magnitude of the reaction force from the polymeric material 204 is decreased.

In one example, as the temperature of the sensor fiber coil 104 increases, one or more of the sensor fiber 202 and the polymeric material 204 expand. Due to the expansion, the sensor fiber 202 exerts a thermal pressure on the polymeric material 204 and the polymeric material 204 exerts a thermal pressure on the sensor fiber 202. The voids 208 compress to promote a decrease in the thermal pressure that the polymeric material 204 exerts on the sensor fiber 202. For example, when the polymeric material 204 expands, the solid material 206 expands into the space previously reserved by the voids 208 rather than adding to the thermal pressure that the polymeric material 204 exerts on the sensor fiber 202.

Contact between the sensor fiber 202 and the polymeric material 204 in one example introduces a stress, strain, stress gradient, and/or strain gradient in the sensor fiber 202. The stress and/or strain may degrade the performance of the sensor fiber 202. For example, the stress and/or strain may reduce the polarization maintaining properties of the sensor fiber 202. The voids 208 compress to promote a decrease in the magnitude of any stress, strain, stress gradient, and/or strain gradient applied by the polymeric material 204 to the sensor fiber 202.

In one example, the polymeric material 204 encapsulates the sensor fiber 202 for the fiber optic gyroscope. The compression of the voids 208 promotes a decrease in measurement bias errors of the fiber optic gyroscope. For example, the decrease in the magnitude of the stress, strain, stress gradient, and/or strain gradient applied by the polymeric material 204 to the sensor fiber 202 promotes an increase in accuracy and a decrease in the rotation sensing bias error of the fiber optic gyroscope. The compression of the voids 208 promotes a decrease in a Shupe coefficient of the fiber optic gyroscope.

In another example, the polymeric material 204 encapsulates one or more electrical components, for example, electronic and optical sensor equipment. A power supply in one example employs the polymeric material 204 as a potting compound for the electrical components. The voids 208 of the polymeric material 204 in one example compress under pressure to avoid structural failure to one of the electrical components such as a glass-bodied diode. The reduced bulk modulus and increased compressibility of the polymeric material 204 due to the voids 208 are advantages for electrical component encapsulation. For example, the reduced bulk modulus and increased compressibility of the polymeric material 204 promotes a decrease in likelihood that contact with the polymeric material 204 will damage the electrical components. In one example, the polymeric material 204 encapsulates an optical coupler. The reduced bulk modulus of the polymeric material 204 allows for complete coverage of the optical coupler with the polymeric material 204. An acoustic sensor in one example employs the polymeric material 204 to buffer an optical fiber from a sensing component. For example, the reduced bulk modulus of the polymeric material 204 promotes a decrease in an amount of acoustic noise that reaches the optical fiber.

In yet another example, the polymeric material 204 with the plurality of voids 208 is used to create the buffer layers 110 and 112. For example, the buffer layers 110 and 112 comprise the plurality of voids 208. As a further example, the polymeric material 204 of the sensor fiber coil 104 and the buffer layers 110 and 112 are made from substantially the same material. Thus, the reduced bulk modulus and increased compressibility characteristics of the polymeric material 204, described herein, are substantially similar to the bulk modulus and compressibility characteristics of the buffer layers 110 and 112 that comprise the plurality of voids 208. The plurality of voids 208 in the buffer layers 110 and 112 promote a decrease in contact forces between the spool 102 and the sensor fiber coil 104.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising the steps of:
introducing a plurality of voids into a polymeric material, wherein the plurality of voids are contained within a plurality of hollow compressible microballoons having a thin polymer wall that encloses a gas and wherein the plurality of voids fill up to twenty-five percent of a total volume of the polymeric material, and the introduction of the plurality of voids into the polymeric material effects a decrease in a bulk modulus of the polymeric material without substantially altering a Young's modulus of the polymeric material;
buffering one or more sensor fibers having one or more stress sensitive components in abutment with a portion of the polymeric material from one or more stresses through employment of the portion of the polymeric material that comprises one or more voids of the plurality of voids, said buffering further comprising the steps of:
forming a pressure-sensitive foam tape from the polymeric material with the plurality of voids:
applying a portion of the pressure-sensitive foam tape to the one or more stress sensitive components; and
encapsulating the portion of the pressure-sensitive foam tape and the one or more stress sensitive components with a potting compound;
accommodating a movement of the portion of the polymeric material through compression of one or more of the one or more voids by means of compression of the gas in the hollow microballoons through a partial collapse of the thin polymer wall;
wherein movement of a portion of the polymeric material is accommodated through compression of at least one of the voids, wherein polymeric material with the voids has a lower Poisson's ratio than the polymeric material without voids, and wherein, since the voids do not substantially alter the Young's modulus of the solid material, a decrease in the Poisson's ratio results in a decrease in the bulk modulus of the polymeric material.

2. The method of claim 1, wherein the step of introducing the plurality of voids into the polymeric material comprises the steps of:
adding the plurality of voids into a resin of the polymeric material; and
curing the plurality of voids and the resin to create a potting compound that comprises the plurality of voids.

3. The method of claim 2, further comprising the steps of:
encapsulating one or more of the one or more stress sensitive components in the potting compound; and
accommodating an expansion of the one or more stress sensitive components through compression of the one or more of the one or more voids.

4. The method of claim 1, wherein the step of adding the plurality of hollow compressible microballons to the polymeric material comprises the steps of:
employing a coupling agent to promote an adhesion between the plurality of hollow compressible microballons and the polymeric material; and
employing the coupling agent to promote a decrease in a settling rate of the plurality of hollow compressible microballons in the polymeric material.

5. The method of claim 1, wherein the step of accommodating the movement of the portion of the polymeric material through compression of the one or more of the one or more voids comprises the step of:
allowing compression of one or more of the one or more voids in response to an applied force to promote a decrease in a response force from the portion of the polymeric material to one or more of the one or more stress sensitive components.

6. The method of claim 2, wherein the step of adding the plurality of voids into the resin of the polymeric material further comprises the step of adding the plurality of voids into the resin of the polymeric material in a substantially uniform distribution.

7. The method of claim 1, wherein the plurality of voids comprise a diameter that is smaller than a distance of separation between adjacent portions of the one or more sensor fibers.

8. The method of claim 7, wherein the diameter of each of the plurality of voids is less than fifty micrometers.

9. The method of claim 1, wherein the plurality of voids fill ten percent of the total volume of the polymeric material.

10. A method, comprising the steps of:
  introducing a plurality of voids into a polymeric material, wherein the plurality of voids are contained within a plurality of hollow compressible microballoons having a thin polymer wall that encloses a gas and wherein the plurality of voids fill up to twenty-five percent of a total volume of the polymeric material, and the introduction of the plurality of voids into the polymeric material effects a decrease in a bulk modulus of the polymeric material without substantially altering a Young's modulus of the polymeric material;
  buffering one or more sensor fibers having one or more stress sensitive components in abutment with a portion of the polymeric material from one or more stresses through employment of the portion of the polymeric material that comprises one or more voids of the plurality of voids, said buffering further comprising the steps of:
    encapsulating a fiber optic sensing coil within the polymeric material that comprises the plurality of voids, wherein the fiber optic sensing coil comprises a first coil portion and a second coil portion, and wherein the first coil portion is adjacent to the second coil portion; and
    locating one or more of the plurality of introduced voids between the first coil portion and the second coil portion;
  accommodating a movement of the portion of the polymeric material through compression of one or more of the one or more voids by means of compression of the gas in the hollow microballoons through a partial collapse of the thin polymer wall;
  wherein movement of a portion of the polymeric material is accommodated through compression of at least one of the voids, wherein polymeric material with the voids has a lower Poisson's ratio than the polymeric material without voids, and wherein, since the voids do not substantially alter the Young's modulus of the solid material, a decrease in the Poisson's ratio results in a decrease in the bulk modulus of the polymeric material.

11. The method of claim 10, wherein the step of introducing the plurality of voids into the polymeric material comprises the steps of:
  adding the plurality of voids into a resin of the polymeric material; and
  curing the plurality of voids and the resin to create a potting compound that comprises the plurality of voids.

12. The method of claim 11, further comprising the steps of:
  encapsulating one or more of the one or more stress sensitive components in the potting compound; and
  accommodating an expansion of the one or more stress sensitive components through compression of the one or more of the one or more voids.

13. The method of claim 11, wherein the step of adding the plurality of voids into the resin of the polymeric material further comprises the step of adding the plurality of voids into the resin of the polymeric material in a substantially uniform distribution.

14. The method of claim 10, wherein the step of adding the plurality of hollow compressible microballoons to the polymeric material comprises the steps of:
  employing a coupling agent to promote an adhesion between the plurality of hollow compressible microballoons and the polymeric material; and
  employing the coupling agent to promote a decrease in a settling rate of the plurality of hollow compressible microballoons in the polymeric material.

15. The method of claim 10, wherein the step of accommodating the movement of the portion of the polymeric material through compression of the one or more of the one or more voids comprises the step of:
  allowing compression of the one or more of the one or more voids in response to an applied force to promote a decrease in a response force from the portion of the polymeric material to one or more of the one or more stress sensitive components.

16. The method of claim 10, wherein the plurality of voids comprise a diameter that is smaller than a distance of separation between adjacent portions of the one or more sensor fibers.

17. The method of claim 16, wherein the diameter of each of the plurality of void is less than fifty micrometers.

18. The method of claim 10, wherein the plurality of voids fill ten percent of the total volume of the polymeric material.

19. The method of claim 10, wherein the first coil portion comprises a first layer of the fiber optic sensing coil, and wherein the second coil portion comprises a second layer of the fiber optic sensing coil; and
  wherein the step of locating one or more of the plurality or introduced voids between the first coil portion and the second coil portion comprises the step of:
  locating one or more of the plurality of the introduced voids between the first layer and the second layer.

20. The method of claim 10, wherein the fiber optic sensing coil comprises a layer of a plurality of optical fiber windings, and wherein the first coil portion comprises a first optical fiber winding of the plurality of optical fiber windings, and wherein the second coil portion comprises a second optical fiber winding of the plurality of optical fiber windings; and
  wherein the step of locating one or more of the plurality of introduced voids between the first coil portion and the second coil portion comprises the step of:
  locating one or more of the plurality of introduced voids between the first winding and the second winding.

* * * * *